Aug. 25, 1970　　　　　　J. L. NEWMAN　　　　　　3,525,969
PRESSURE ALTIMETER FOR WEATHER BALLOONS
Filed June 21, 1968　　　　　　　　　　　　2 Sheets-Sheet 1

INVENTOR:
JAMES L. NEWMAN

Richards, Harris & Hubbard
ATTORNEY

United States Patent Office 3,525,969
Patented Aug. 25, 1970

---

3,525,969
PRESSURE ALTIMETER FOR WEATHER BALLOONS
James L. Newman, 1321 Glen Cove,
Richardson, Tex. 75080
Filed June 21, 1968, Ser. No. 739,050
Int. Cl. G01i 9/02
U.S. Cl. 338—41
15 Claims

ABSTRACT OF THE DISCLOSURE

A pressure transducer in which a potentiometer is hermetically sealed in an evacuated chamber formed by a support and a metal bellows. The potentiometer includes an elongated resistance coil, a plunger rod extending parallel to the coil and slidably supported in two bearing sleeves at the ends of the coil, and a wiper mounted on the center of the plunger which slides over the coil. The potentiometer may be mounted on a header and disposed wholly within the bellows, or primarily within a hermetically sealed housing to provide minimum size and weight. In either form, a tube extending through the header receives one end of the plunger rod and provides a means for either evacuating the chamber or for supplying fluid to the interior of the chamber so as to measure the pressure of the fluid.

BACKGROUND OF THE INVENTION

This invention relates generally to pressure transducers for producing an electrical signal which varies in proportion to the pressure of a fluid, and more particularly relates to such a device which is useful in the telemetry package of a weather balloon.

The U.S. Weather Bureau compiles atmospheric weather data on a periodic basis by releasing a lighter than air balloon which carries a telemetering package aloft. The telemetering package provides a continuous measure of temperature, wind direction, and other data which is useful if the instantaneous altitude of the balloon is known. Since these balloons cannot be recovered and reused, it is very important from an economic standpoint to reduce the cost of each unit. The cost can be reduced by reducing the cost of the telemetry system itself, and by reducing the weight of the telemetry system so that the size of the balloon can be reduced. Small, lightweight devices heretofore available for this purpose are relatively expensive. In addition, the smaller devices produce such a small output signal that preamplification is required, thus substantially increasing the cost of the telemetry system.

SUMMARY OF INVENTION CLAIMED

This invention is concerned with a small, lightweight, simple, reliable, inexpensive pressure transducer particularly suited for use in the telemetry package of a weather balloon, although the transducer can be advantageously used for other applications. When used as an altitude sensor, the pressure transducer has minimum error due to temperature variations. All working parts of the transducers are disposed in a hermetically sealed chamber so that they can be stored in substantially any climate for extended periods of time without jeopardizing the operation of the device.

This invention contemplates a pressure-to-electrical transducer comprised of a support, a plurality of electrical leads extending through the support, a hermetic seal between the electrical leads and the support, a potentiometer mounted on the support having a reciprocating plunger the position of which determines the resistance value of the potentiometer which is electrically connected to the electrical leads, and a bellows hermetically sealed to the support such that the potentiometer is disposed within a hermetically sealed chamber formed by the support and the bellows.

In accordance with more specific aspects of the invention, the potentiometer includes an elongated coil and a wiper connected to the plunger and slidably contacting the coil. In one embodiment, the coil and wiper are disposed within a rigid housing and the plunger extends through an opening in the housing into the interior of a small bellows. In an alternative embodiment, the entire potentiometer is mounted on a flat header and disposed entirely within a larger bellows hermetically sealed to the header.

The invention also contemplates a low friction potentiometer comprised of a support, an elongated coil mounted on the support, a plunger rod disposed parallel to the support and slidably supported at two spaced points by the support, and a wiper mounted on the plunger between the support points which slides on the coil.

BRIEF DESCRIPTION OF THE DRAWINGS

The novel features believed characteristic of this invention are set forth in the appended claims. The invention itself, however, as well as other objects and advantages thereof, may best be understood by reference to the following detailed description of illustrative embodiments, when read in conjunction with the accompanying drawings, wherein:

DESCRIPTION OF PREFERRED EMBODIMENTS

Figure 1:
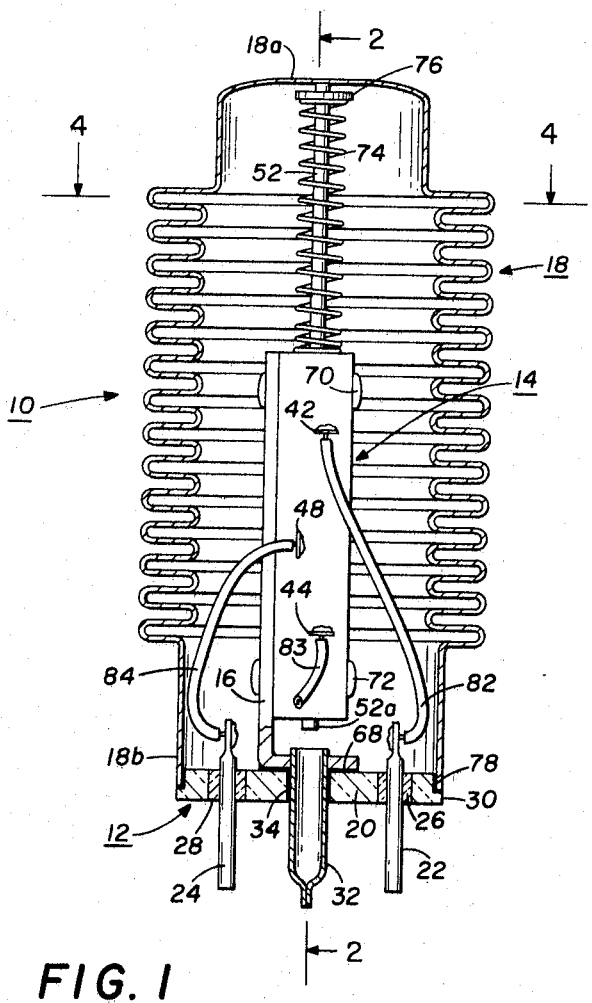
FIG. 1 is a sectional view of a pressure transducer constructed in accordance with the present invention with the transducer indicating a low external pressure.

Referring now to the drawings, a pressure transducer constructed in accordance with the present invention is indicated generally by the reference numeral 10 in FIG. 1. The pressure transducer 10 is comprised of a header assembly, indicated generally by the reference numeral 12, a potentiometer, indicated generally by the reference numeral 14, which is mounted on the header 12 by a bracket 16, and a bellows, indicated generally by the reference numeral 18, which is hermetically sealed to the periphery of the header assembly 12.

The header assembly 12 may be of either the conventional insulator type, which are comprised primarily of glass, ceramic, or plastic around metal leads, or a metal type which are comprised primarily of metal with a donut of insulation around metal leads. The latter is used in the device 10 and includes a metal disk 20 which is typically about three-quarters of an inch in diameter. A plurality of electrical leads 22, 23 and 24 extend through the disk 20 and are hermetically sealed in the disk and electrically isolated from the disk by glass bodies 26, 27 and 28, respectively. The interior ends of the electrical leads 22–24 may conveniently be conformed as an eyelet so that lead wires can be more easily soldered to the leads. The outer periphery of the disk 20 is provided with an annular shoulder 30 to assist in aligning the open end of the bellows 18. A tube 32, which is rather easily collapsible, extends through the center of the disk 20 and is hermetically sealed in the disk by solder 34 or other suitable bonding material.

Figure 3:
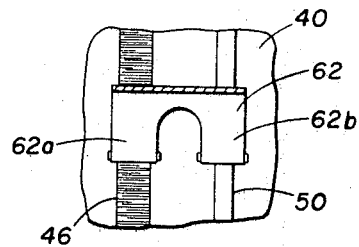
FIG. 3 is a fragmentary view of a portion of the potentiometer of the transducer of FIG. 1.

The potentiometer 14 is comprised of a plastic body 40 which is molded around the leads 42 and 44 from an elongated resistor coil 46. The resistor coil 46 is comprised of a length of wire wound around a nonconductive core in the conventional manner. The plastic body 40 is also molded around the lead 48 of a conductive slide bar 59 (see FIG. 3) which is disposed parallel to the elongated coil 46. A plunger rod 52 is reciprocally disposed in the plastic body 40 and is slidably supported by a pair of spaced bearing sleeves 54 and 56 formed by cylindrical passageways in the body 40. A wiper assembly, indicated generally by the reference numeral 58, is mounted on the plunger rod 52 between the bearing support points 54 and 56 and includes a plastic body 60 molded around a spring metal wiper plate 62. The wiper plate 62 is bifurcated and has one finger 62a which slides on the elongated coil 46 and another finger 62b which slides on the bar 50. The wiper plate 62 is electrically insulated from the plunger rod 52 by the plastic body 60 which may receive the plunger rod 52 in a counterbore and which may be secured on the plunger rod 52 by snap rings 64 and 66 received in grooves in the plunger rod 52.

The bracket 16 may be mounted on the header assemby 12 by solder 68 or other suitable bonding material. The potentiometer assembly 14 is mounted on the bracket 16 by a pair of brads 70 and 72 which extend through the plastic body 40. The potentiometer 14 is aligned such that the lower end of the plunger rod 52 projects into the evacuation tube 32 when in the retracted position shown in FIG. 2. The plunger rod 52 is biased upwardly to the extended position shown in FIG. 1 by a coil spring 74 which is disposed around the plunger rod and engages an enlarged head 76 and the plastic body 40. The spring 74 thus biases the end of the head 76 of the plunger rod 52 against the closed end 18a of the bellows 18. If desired, the end of the plunger rod 52 can be connected to the closed end 18a of the bellows 18 and the spring 74 eliminated.

Figure 2:
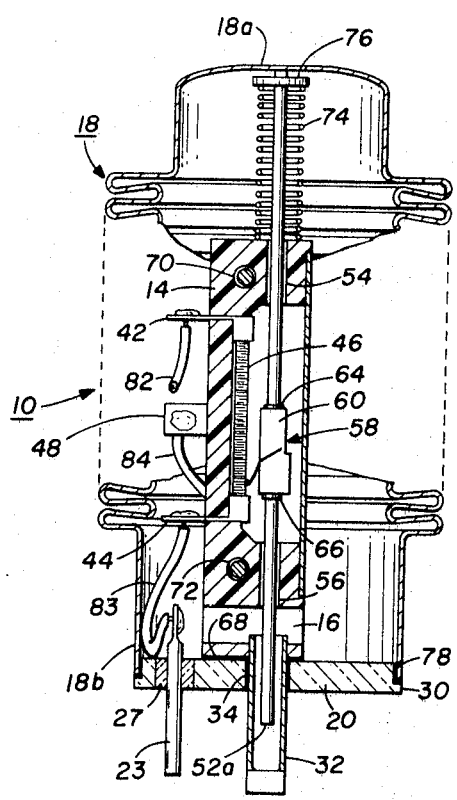
FIG. 2 is a sectional view taken substantially on lines 2—2 of FIG. 1 with the transducer indicating a high external pressure.
Figure 4:
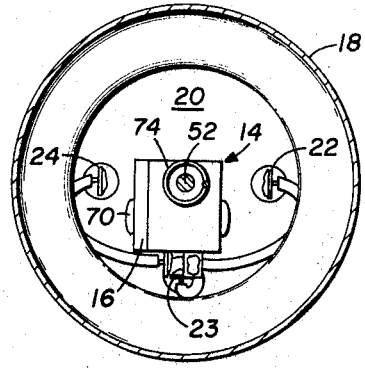
FIG. 4 is a sectional view taken substantially on lines 4—4 of FIG. 1.

After the leads 42, 44 and 48 of the potentiometer are electrically connected to the leads 22, 23 and 24 of the header by insulated wires 82, 83 and 84, respectively, the open end 18b of the bellows 18 is hermetically sealed to the periphery of the header disk 20 by solder 78 or other suitable bonding material. As a result of the hermetic seals between the disk 20 and the leads 22–24, the tube 32 and the bellows 18, the potentiometer 14 is encapsulated in a hermetically sealed chamber. When initially assembled and with equal pressure inside and outside the hermetically sealed chamber, the bellows 18 is extended such that the plunger rod 52 is at its uppermost limit of travel as illustrated in FIG. 1. As the hermetically sealed chamber is evacuated through the evacuation tube 32, the atmospheric pressure collapses the bellows 18 and forces the plunger rod 52 downwardly toward its low limit of travel, as illustrated in FIG. 2. In the retracted position, the lower end 52a of the plunger rod extends into the evacuation tube 32. This permits a reduction in the total height of the device. After the hermetic chamber has been evacuated to the extent necessary to collapse the bellows to the desired point, the tube 32 may be sealed and the excess portions of the tube severed. The device may then be mounted on a printed circuit board, or plugged into a vacuum tube type socket.

Since all parts of the device are within the hermetically sealed chamber, the device can be stored for long periods of time in substantially any climate without endangering its subsequent operation. As the pressure outside the device 10 decreases due to ascension of the balloon, the natural spring force of the bellows 18 together with the pressure of the fluid remaining in the sealed chamber and the force of spring 74 cause the bellows to expand and permits the spring 74 to force the plunger rod 52 upwardly, thus changing the electrical resistance of the potentiometer 14. This resistance value is then telemetered to the ground where it is calibrated to indicate the altitude of the balloon as the balloon rises. The potentiometer 14 has a very low resistance to movement due to the two spaced bearing surfaces 54 and 56. However, the device 10 provides a very large percentage change in the resistance value, thus eliminating the need for amplification and simplifying the telemetry system.

Figure 6:
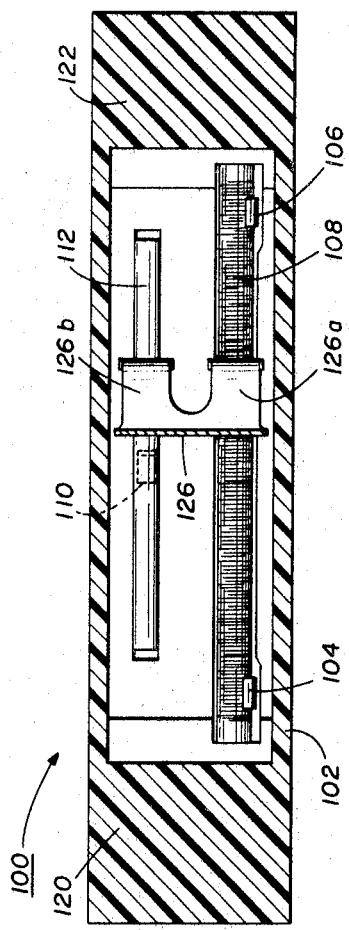
FIG. 6 is a sectional view taken substantially on lines 6—6 of FIG. 5.
Figure 5:
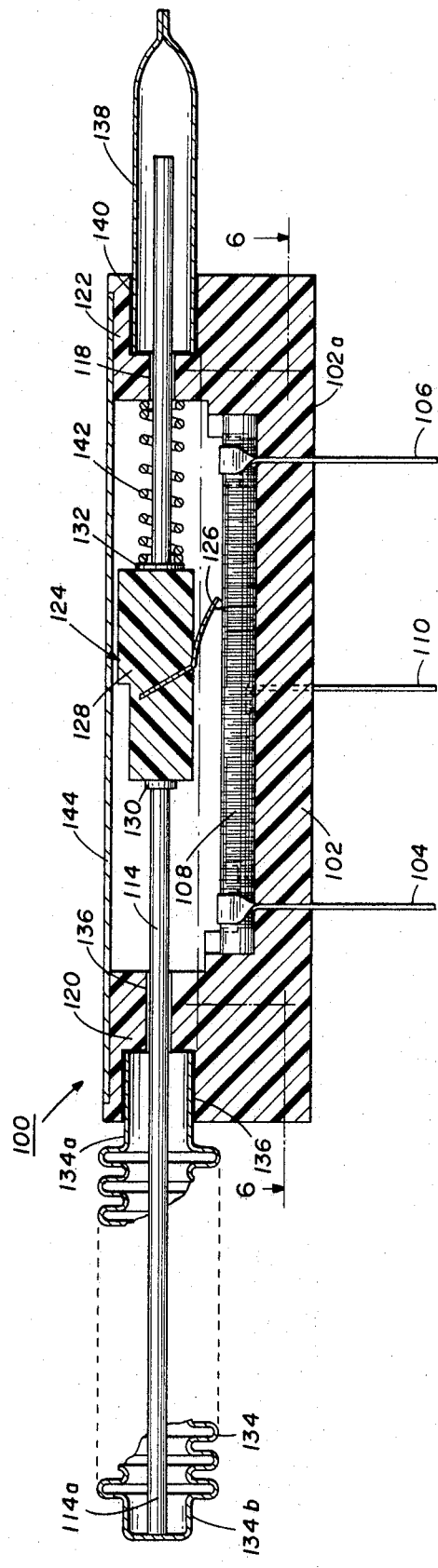
FIG. 5 is a sectional view of another pressure transducer constructed in accordance with the present invention.

Another embodiment of the invention is indicated generally by the reference numeral 100 in FIGS. 5 and 6. The device 100 is comprised of a plastic body 102 which is molded around the leads 104 and 106 of an elongated resistor coil 108. The resistor coil 108 may comprise a long length of wire wound around an insulating bar. The leads 104 and 106 may comprise flat metal strips soldered to the ends of the wire coil. The plastic body 102 is also molded around the lead 110 of a metal slide bar 112 which is disposed parallel to the elongated resistor coil 108. The plastic body 102 thus supports the resistor coil 108 and the slide bar 112, and also forms a hermetic seal around the leads. The leads 104, 106 and 110 project from a flat face 102a of the body 102 and are adapted to be connected to a printed circuit board.

A plunger rod 114 is reciprocally disposed in the housing 102 and extends through bearing sleeves 116 and 118 formed by cylindrical passageways in the end walls 120 and 122 of the housing 102. A wiper assembly, indicated generally by the reference numeral 124, is connected to a midpoint of the plunger rod 114. The wiper assembly 124 may be substantially identical to the wiper assembly 58 and includes a bifurcated spring metal wiper plate 126 having fingers 126a and 126b which extend into sliding contact with the elongated coil 108 and the slide bar 112, respectively. The wiper plate 126 is embedded in a plastic body 128 which is disposed around the plunger rod 114 and secured in place by snap rings 130 and 132.

A bellows 134 is disposed concentric to the plunger rod 114 and has a shank portion 134a at the open end which extends into a counterbore to the bearing sleeve 118 and is hermetically sealed to the plastic housing 102 by a suitable bonding agent 136. A collapsible evacuating tube 138 is disposed concentric to the other end of the plunger rod 114 and extends into a counterbore to the bearing sleeve 116 and is hermetically sealed to the body 102 by a suitable bonding agent 140. The end 114a of the plunger rod 114 is continuously biased against the closed end 134b of the bellows 134 by a coil spring 142 disposed around the plunger rod and acting against the interior surface of the end wall 122 and the plastic body 128 of the wiper assembly 124. A lid 144 is hermetically sealed to the top of the housing 102 to provide a hermetically sealed chamber around the potentiometer assembly.

The device 100 may be used in the same manner as the device 10 by evacuating the interior of the hermetically sealed chamber through the evacuation tube 138, sealing the end of the evacuation tube, and severing the excess. As the hermetically sealed chamber is evacuated, the atmospheric pressure collapses the bellows 134 and moves the wiper assembly 124 to the right-hand position of travel when referring to FIG. 5. Then as the pressure around the device decreases due to ascension of the weather balloon, the bellows 134 expands due to its natural spring effect, allowing the spring 142 to move the wiper assembly 124 and change the resistance of the potentiometer. If desired, the end 114a of the plunger rod 114 can be connected to the closed end 134b of the bellows and the coil spring 142 eliminated.

The pressure transducers 10 and 100 can also be used to advantage by connecting the sealing tubes 32 and 138, as the case may be, to a source of fluid the pressure of which is to be measured. In this case, the sealing tubes are, of course, not closed. The fluid pressure will then be contained within the hermetically sealed chamber. In the latter case, the bellows is constructed such that it assumes a collapsed position with equal pressure on both sides of the bellows.

If desired, a pair of separate tubes may be hermetically sealed in the header, one for receiving the end of the plunger rod and one for evacuating the hermetically sealed chamber or for supplying fluid under pressure to the chamber.

Although preferred embodiments of the invention have been described in detail, it is to be understood that various changes, substitutions and alterations can be made in the invention without departing from the spirit and scope of the invention as defined by the appended claims.

What is claimed is:

1. A pressure-to-electrical transducer comprising the combination of:
    a support,
    a plurality of electrical leads extending through the support,
    a hermetic seal between the electrical leads and the support,
    a potentiometer mounted on the support having a reciprocating plunger the position of which relative to an impedance member determines the resistance value of the potentiometer, the plunger being slidably supported on each side of the impedance member, the potentiometer being electrically connected to the electrical leads, and
    a bellows hermetically sealed to the support such that the potentiometer is disposed within a sealed chamber formed by the support and the bellows, the bellows being operatively associated with the plunger to change the resistance value of the potentiometer as the bellows expands and contracts.

2. The combination defined in claim 1 wherein the potentiometer includes:
    an elongated coil electrically connected at the ends thereof to a pair of the leads, and
    a wiper connected to the plunger and slidably contacting the coil, the wiper being electrically connected to another of the leads.

3. The combination defined in claim 2 wherein:
    the coil and wiper are disposed within a housing formed by the support, and
    the plunger extends through an opening in the support into the interior of the bellows.

4. The combination defined in claim 2 wherein the coil and wiper are disposed within the bellows.

5. The combination defined in claim 1 wherein the hermetically sealed chamber is partially evacuated.

6. The combination defined in claim 1 further characterized by a collapsible tube extending through and hermetically sealed in the support.

7. The combination defined in claim 6 wherein the hermetically sealed chamber is partially evacuated and the evacuation tube sealed.

8. The combination defined in claim 6 wherein the tube is connected to the source of fluid the pressure of which is to be measured.

9. A pressure-to-electrical transducer comprising the combination of:
    a generally planar header having a plurality of electrical leads extending therethrough generally at right angles, the electrical leads being hermetically sealed in the header,
    a potentiometer mounted on the interior face of the header having a plunger extending away from the header generally at a right angle, a wiper mounted on a midpoint of the plunger for varying the resistance of the potentiometer, bearing sleeves on each side of the wiper slidably supporting the plunger, the potentiometer being electrically connected to the leads extending through the header, and
    a bellows disposed around the potentiometer and connected to the header with a hermetic seal to enclose the potentiometer in a hermetically sealed chamber, the closed end of the bellows being operatively associated with the plunger to vary the resistance of the potentiometer as the bellows expands and contracts.

10. The combination defined in claim 9 wherein:
    the potentiometer comprises an elongated coil disposed generally parallel to the plunger, the ends of the coil being electrically connected to a pair of the leads extending through the header, and
    a wiper connected to the plunger and in sliding contact with the coil, the wiper being electrically connected to another of the electrical leads.

11. The combination defined in claim 9 further characterized by a tube extending through the header and hermetically sealed therein.

12. The combination defined in claim 9 wherein:
    one end of the plunger extends into a tube hermetically sealed in the header when the bellows is collapsed.

13. A pressure-to-electrical transducer comprising the combination of:
    a plurality of electrically isolated leads extending through the housing and hermetically sealed therein,
    an elongated coil disposed in the housing, the ends of the coil being electrically connected to the leads,
    a plunger rod disposed parallel to the elongated coil and extending through an opening in the housing,
    a wiper mounted on a midpoint of the plunger rod in sliding contact with the elongated coil and being electrically connected to another of the leads,
    the plunger rod being slidably supported by the housing on each side of the wiper, and,
    a bellows hermetically sealed to the housing around the opening in the housing, the bellows being operatively associated with the plunger rod to reciprocate the plunger rod in the housing and move the wiper over the coil as the bellows expands and contracts.

14. The combination defined in claim 13 wherein the leads extend from a face of the housing disposed generally parallel to the plunger rod.

15. The combination defined in claim 13 further characterized by:
    a second opening in the housing around the end of the plunger rod opposite from the bellows, and
    a tube sealed to the housing around the second opening and receiving the end of the plunger rod when the bellows is collapsed.

References Cited

UNITED STATES PATENTS 2,901,718  8/1959  Rehnborg et al. ___ 73—398 XR
3,173,120  3/1965  Marks et al. _____ 73—398 XR DONALD O. WOODIEL, Primary Examiner U.S. Cl. X.R.

73—398, 410